United States Patent

Kawasaki

Patent Number: 5,905,357
Date of Patent: May 18, 1999

[54] POWER GENERATION CONTROL APPARATUS FOR MOTORCAR POWER DISTRIBUTOR

[75] Inventor: Nozomi Kawasaki, Shizuoka, Japan

[73] Assignee: Yazaki Corporation, Tokyo, Japan

[21] Appl. No.: 08/819,800

[22] Filed: Mar. 18, 1997

[30] Foreign Application Priority Data

Mar. 18, 1996 [JP] Japan .................................. 8-088872

[51] Int. Cl.⁶ ...................................................... H02J 7/00
[52] U.S. Cl. .............................. 320/104; 322/19; 322/27; 322/28
[58] Field of Search .............................. 320/104; 322/19, 322/27, 28

[56] References Cited

U.S. PATENT DOCUMENTS

| | | | |
|---|---|---|---|
| 4,888,716 | 12/1989 | Uenu | 324/429 |
| 4,985,670 | 1/1991 | Kaneyuki et al. | 322/28 |
| 5,352,971 | 10/1994 | Nishimura | 322/27 |

*Primary Examiner*—Peter S. Wong
*Assistant Examiner*—Lawrence Luk
*Attorney, Agent, or Firm*—Armstrong, Westerman, Hattori, McCleland & Naughton

[57] ABSTRACT

A power generation control apparatus to be used for a motorcar power distributor can effectively prevent any excessive charging current from flowing into the battery and consequently protect the battery against degradation. Additionally, it can minimize fluctuations in the supply voltage and functional failures in the loads of the electric equipment of the motorcar. The power generation control apparatus to be used for a motorcar power distributor comprises an alternator for generating an alternating current to be subjected to full-wave rectification by means of a rectifier to produce a direct current, said alternator being connected to the power supply route from the battery by way of an alternator supply line at a point immediately upstream relative to the branch point for branching the power supply so that the battery may be charged with power generated by the alternator and the loads may be fed respectively with the branched power supply. A power supply control means determines the relationship between the current detected by a load feeding current sensor and the current detected by a generated current sensor by comparing their intensities and controlling the rate of power generation of said alternator according to the determined relationship.

5 Claims, 6 Drawing Sheets

POWER GENERATION CONTROL APPARATUS FOR MOTORCAR POWER DISTRIBUTOR

BACKGROUND OF THE INVENTION

1. Field of the Invention

This invention relates to a power generation control apparatus to be used for a motorcar and, more particularly, it relates to a motorcar power generation control apparatus for controlling the power output of the alternator of a motorcar for electrically charging the battery and supplying the electric equipment with power in the motorcar.

2. Prior Art

Figure 7:
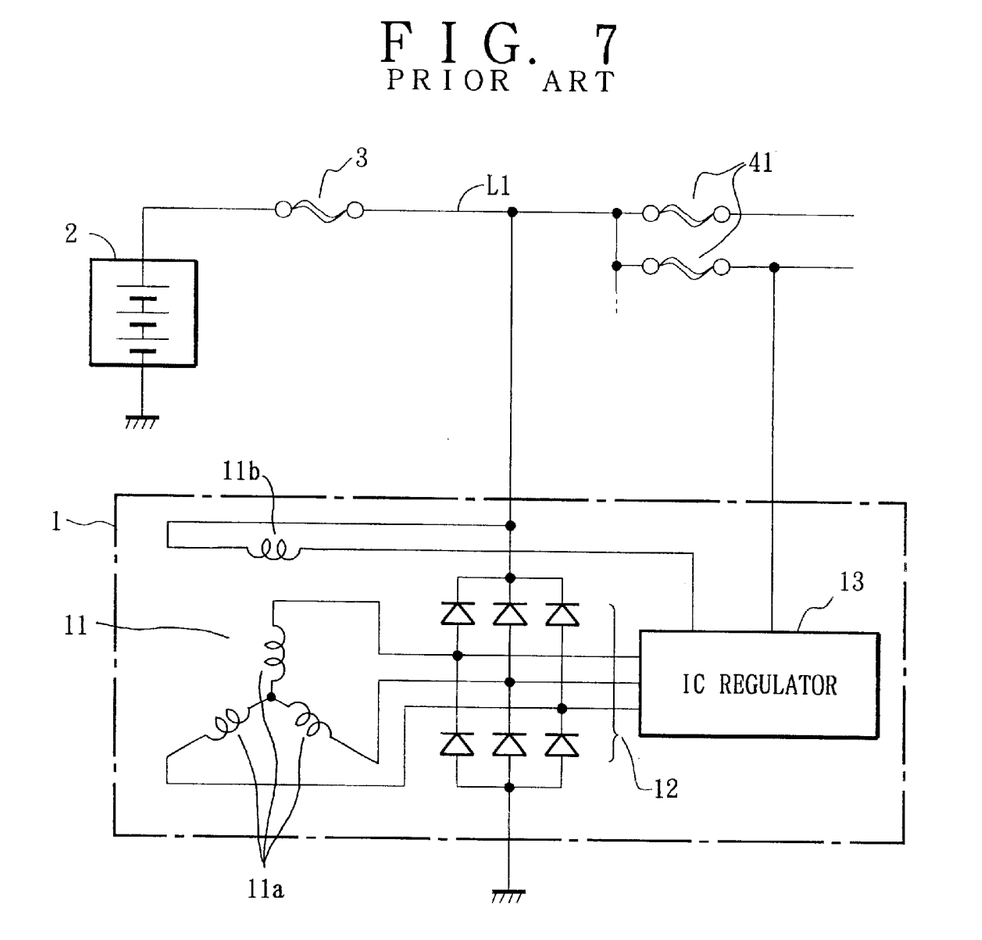
FIG. 7 is a circuit diagram of a comparable known apparatus.

FIG. 7 of the accompanying drawings is a schematic circuit diagram of a known arrangement for controlling the power output of the alternator of a motorcar. Referring to FIG. 7, there is shown an alternator comprising an AC generator 11, six rectifiers (diodes) 12 and an IC regulator 13, which are housed in a common case.

The AC generator 11 comprises a stator coil 11a having star-connected three-phase windings and a field coil (rotor coil) 11b. As the electric magnet carrying the field coil 11b as part thereof is driven to rotate, the generator produces from its stator coil 11a a three-phase electric current due to the alternating voltage generated in the stator coil 11a and having three phases that are shifted by 120° from each other. The alternating current generated in the stator coil 11a is then subjected to full-wave rectification by means of a full-wave rectifier 12 comprised of a total of six diodes to give rise to a direct current, which is subsequently used to electrically charge a battery 2 by way of a fusible link 3 for protecting the battery and/or feed the electric equipment (not shown) of the motorcar. The electric current for energizing the rotor to make it operate as an electric magnet is fed to the field coil 11b as an excitation current by way of a brush and a slip-ring (not shown) under the control of an IC regulator 13.

If a constant excitation current is fed to the field coil 11b, the electromotive force generated by the AC generator 11 is proportional to the number of revolutions per unit time of the field coil 11b so that the generated voltage has to be regulated. Thus, the IC regulator 13 regulates the excitation current flowing to the field coil 11b in order to maintain the generated voltage to a constant level.

On the other hand, the battery 2 is connected to the alternator 1 by way of a FL 3 for protecting the battery. Each of the loads of the electric equipment of the motorcar is also fed with electricity from the alternator 1 also by way of the FL 3 and the supply line L1 of FIG. 7.

Referring to FIG. 7, the IC regulator 13 is not a relay-based regulator but an IC-based voltage regulator for controlling the output voltage of the AC generator 11 so that it may be housed in the case 1 of the alternator 1. It uses a power transistor for the final regulating stage to raise the intensity of the electric current flowing to the field coil 11b in order to improve the performance of the alternator 1 and also the accuracy of voltage regulation.

When, the ignition switch (not shown) of the motorcar is turned on, the IC regulator 13 operates to cause an excitation current to flow from the battery 2 to the field coil 11b by way of a brush and a slip-ring (not shown) in order to start the AC generator. As the field coil 11b is driven to rotate, an induced electromotive force is generated in the stator coil 11a and the produced electric current is rectified by the rectifier 12 and then electrically charge the battery 2 by way of the FL 3 for protecting the battery. As the voltage generated by the AC generator 11 rises, the voltage at the voltage detection input of the IC regulator 13 connected to the load side terminals of load FLs 41, . . . also rises so that the IC regulator 13 reduces the excitation current flowing to the field coil 11b to maintain the voltage generated by the AC generator 11 to a predetermined constant level.

With the above described known arrangement, wherein the voltage applied to the loads is monitored at the voltage detection input of the IC regulator 13 to control the level of power generation, only the supply voltage is held to a constant level and the intensity of the electric current flowing from the alternator 1 is not controlled while the loads of the electric equipment of the motorcar may be independently turned on and off.

Thus, if the electric charge of the battery 2 has been significantly discharged and the battery 1 shows a reduced voltage, an excessive electric current may flow into the battery 2 in order to electrically recharge it until it is unusually heated to become degraded and/or the FL 3 for protecting the battery is fused, if partly.

As for supplying power to the loads of the electric equipment, the above arrangement modifies the power generated by the alternator 1 by detecting the fall of the voltage that appears when the alternator 1 starts feeding the loads so that there occurs a time lag for the operation of controlling the voltage, leading to significant fluctuations in the supply voltage and, in some cases, functional failures on the part of some of the loads.

BRIEF SUMMARY OF THE INVENTION

In view of the above identified problems of known arrangements for controlling alternators, it is therefore a primary object of the present invention to provide a power generation control apparatus to be used for a motorcar power distributor that can effectively prevent any excessive charging current from flowing into the battery and consequently protect the battery against degradation.

Another object of the present invention is to provide a power generation control apparatus to be used for a motorcar power distributor that can minimize fluctuations in the supply voltage and functional failures in the loads of the electric equipment of the motorcar.

According to an aspect of the invention, the above objects are achieved by providing a power generation control apparatus to be used for a motorcar power distributor comprising an alternator 1 for generating an alternating current to be subjected to full-wave rectification by means of a rectifier 12 to produce a direct current, said alternator 1 being connected to the power supply route from the battery 2 by way of an alternator supply line L2 at a point immediately upstream relative to the branch point for branching the power supply so that the battery may be charged with power generated by the alternator and the loads 40 may be fed respectively with the branched power supply, characterized in that it comprises a load feeding current sensor 104 for detecting the intensity of the electric current flowing through said power supply route at a point immediately upstream relative to the branch point, a generated current sensor 105 for detecting the intensity of the electric current flowing through said alternator supply line and a power supply control means 103 for determining the relationship between the current detected by said load feeding current sensor and the current detected by said generated current sensor by comparing their intensities and controlling the rate of power generation of said alternator according to the determined relationship.

With the above arrangement, the load feeding current sensor 104 detects the sum of the load currents flowing to the respective loads as it is arranged at a point immediately upstream relative to the branch point for branching the power supply and the generated current sensor 105 detects the current power generating status of the alternator 1 as it detects the intensity of the electric current flowing through the alternator supply line L2. Then, the power supply control means 103 determines the relationship between the current detected by the load feeding current sensor and the current detected by the generated current sensor by comparing their intensities and controls the power generated by said alternator according to the determined relationship so that the level of the power generated by the alternator 1 can be regulated to match the sum of the load currents and the battery can be controlled appropriately for charging.

Preferably, said power supply control means increases the rate of power generation of said alternator when the intensity of current detected by said generated current sensor is lower than the intensity of current detected by said load feeding current sensor.

With such an arrangement, the battery is protected against any shortage of electricity for charging it because the level of the power generated by the alternator is made to match the sum of the load currents by increasing the rate of power generation of the alternator whenever the intensity of current detected by the generated current sensor is lower than the intensity of the current detected by the load feeding current sensor.

Preferably, a power generation control apparatus according to the invention additionally comprises a liquid temperature sensor 30 for detecting the temperature of the liquid of the battery and transmitting a temperature signal representing the detected temperature and said power supply control means monitors the charged condition of the said battery by way of the temperature signal from said liquid temperature sensor when the intensity of current detected by said generated current sensor is higher than the intensity of current detected by said load feeding current sensor and reduces the rate of power generation of the alternator according to the temperature rise in the liquid of the battery.

With such an arrangement, the battery is protected against any overcharge because the power supply control means monitors the charged condition of the battery by way of the temperature signal from the liquid temperature sensor when the intensity of current detected by the generated current sensor is higher than the intensity of current detected by the load feeding current sensor and reduces the rate of power generation of the alternator according to the temperature rise in the liquid of the battery.

Preferably, the alternator has a switching means arranged on the power supply route at a point closer to the battery than the point of connection of the alternator supply line and said power supply control means cuts said battery off the power supply route by turning off said switching means when the intensity of current detected by said generated current sensor is excessively higher than the intensity of current detected by said load feeding current sensor.

With such an arrangement, the battery is also protected against any overcharge because the power supply control means cuts the battery off the power supply route by turning off the switching means when the intensity of current detected by the generated current sensor is excessively higher than the intensity of current detected by the load feeding current sensor.

Preferably, said power supply control means receives data on the switching operations conducted for turning on and off said loads and increases the rate of power generation of said alternator when it detects any increase in the number of operating loads.

With such an arrangement, no voltage drop occurs when one or more than one loads start operating because the power supply control means receives data on the switching operations conducted for turning on and off the loads and increases the rate of power generation of the alternator when it detects any increase in the number of operating loads.

According to another aspect of the invention, there is provided a power generation control apparatus to be used for a motorcar power distributor comprising an alternator 1 having an AC generator 11 including a stator coil 11a for generating an alternating current to be subjected to full-wave rectification by mean of a rectifier 12 to produce a direct current, a field coil 11b and a regulator 13 for regulating the excitation current flowing to said field coil 11b in order to electromotive force of said alternator 1, said alternator 1 being connected to the power supply route from the battery 2 by way of an alternator supply line L2 at a point immediately upstream relative to the branch point for branching the power supply so that the battery may be charged with power generated by the alternator and the loads 40 may be fed respectively with the branched power supply, characterized in that it comprises a load feeding current sensor 104 for detecting the intensity of the electric current flowing through said power supply route at a point immediately upstream relative to the branch point, a generated current sensor 105 for detecting the intensity of the electric current flowing through said alternator supply line and a power supply control means 103 for determining the relationship between the current detected by said load feeding current sensor and the current detected by said generated current sensor by comparing their intensities and controlling the intensity of the excitation current flowing to said field coil by controlling said regulator according to the determined relationship.

With the above arrangement, the load feeding current sensor 104 detects the sum of the load currents flowing to the respective loads as it is arranged at a point immediately upstream relative to the branch point for branching the power supply and the generated current sensor 105 detects the current power generating status of the alternator 1 as it detects the intensity of the electric current flowing through the alternator supply line L2. Then, the power supply control means 103 determines the relationship between the current detected by the load feeding current sensor and the current detected by the generated current sensor by comparing their intensities and controls the intensity of the excitation current flowing to the field coil 11b of the AC generator 11 by controlling the regulator 13 according to the determined relationship so that the level of the power generated by the alternator 2 can be regulated to match the sum of the load currents and the battery can be controlled appropriately for charging.

DETAILED DESCRIPTION OF THE INVENTION

Figure 1:
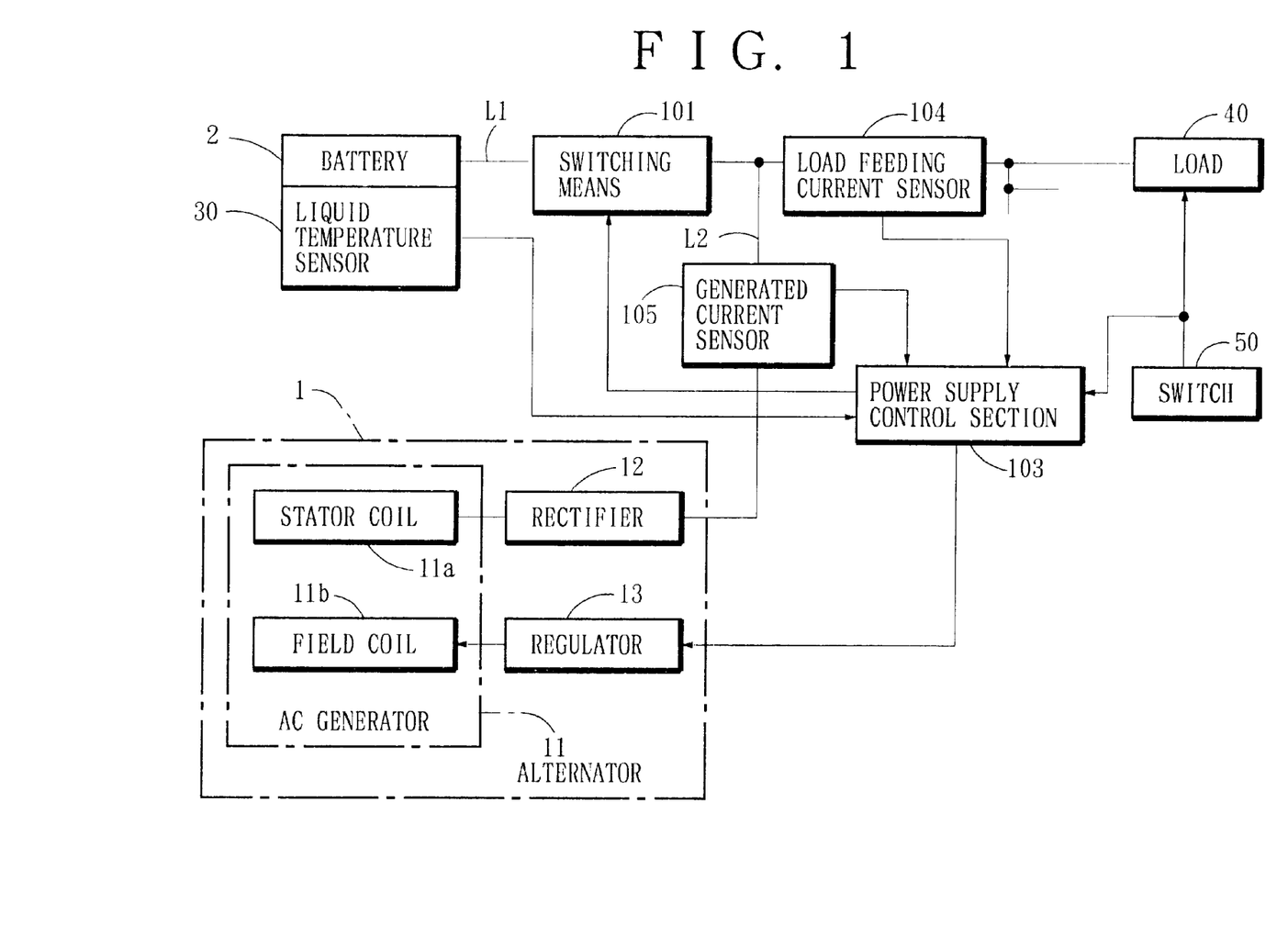
FIG. 1 is a block diagram of the basic configuration of a motorcar power distributor according to the invention.
Figure 2:
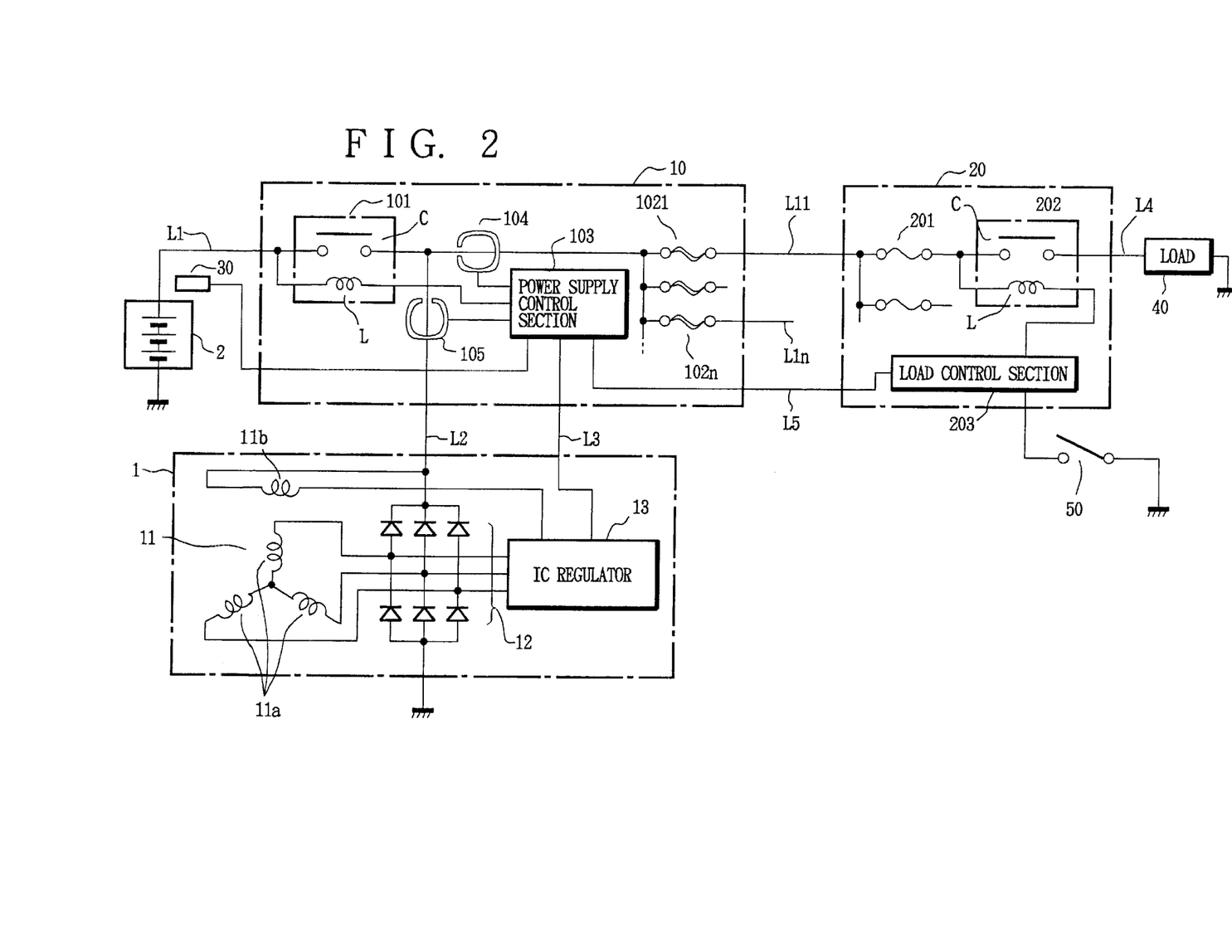
FIG. 2 is a circuit diagram of a preferred embodiment of a power generation control apparatus to be used for a motorcar power distributor according to the invention.

Now, the present invention will be described in greater detail by referring to the accompanying drawings that illustrate a preferred embodiment of the invention. FIG. 2 is a circuit diagram of a preferred embodiment of a power generation control apparatus according to the invention and incorporated into a motorcar power distributor. In FIG. 2, the components that are same or similar to those of FIG. 7 are denoted respectively by the same reference symbols and will not be described any further.

Referring to FIG. 2, the blocks denoted respectively by 10 and 20 are a power supply box of a motorcar power distributor and a load connection box for electrically connecting the loads to be fed by a battery.

The power supply box 10 is arranged near the battery 2 within the engine room of the motorcar and fed with power by the battery 2 by way of the battery supply line L1. The power supplied by way of the battery supply line L1 is divided among a plurality of fusible links (FLs) 1021 through 102n for so many loads by way of a battery cut-off relay 101. The divided power is fed from the power supply box 10 to the downstream loads by way of respective load feeding lines L11 through L1n. An alternator 1 is also arranged within the engine room and connected to the power supply box 10 by way of an alternator supply line L2 and the power generated by the alternator 1 is fed to the connection points connecting the battery cut-off relay 101 and the plurality of fusible links (FLs) 1021 through 102n.

The power supply box 10 has a power supply control section 103 that comprises a microcomputer operated by a given program. The power supply control section 103 receives a current intensity signal representing the intensity of current detected by a load feeding current sensor 104 and another current intensity signal representing the intensity of current detected by a generated current sensor 105 along with a signal representing a switching status transmitted from a load connection box 20 which will be described hereinafter, processes the received signals and generates a control signal for controlling the rate of power generation and an ON/OFF control signal to be fed to the battery cut-off relay 101. The control signal for controlling the rate of power generation is applied to an IC regulator 13 by way of a signal line L3. The battery cut-off relay 101 comprises relay contact C and a relay coil L operating as an ON/OFF switch according to the state of power supply of the contact and controlled by an ON/OFF control signal transmitted from the power supply control section 103.

The load feeding current sensor 104 typically comprises a magnetism sensing device such as a Hall device disposed within the magnetic path of a ring core to detect the magnetic flux generated when an electric current flows through the power supply route upstream relative to the branch point of the FLs 1021 through 102n and having an intensity proportional to the intensity of the electric current. The generated current sensor 105 has a configuration similar to that of the load feeding current sensor 104 so that it detects the intensity of the magnetic flux generated when an electric current flows from the alternator 1 through the alternator supply line L2 in order to detect the intensity of the electric current. The liquid temperature sensor 30 detects the temperature of the liquid in the battery to indirectly find out the charged state of the battery. The ON/OFF control signal for the load switch is used to find out the sum of the load currents consumed by the operating loads or the level of the power that has to be fed to the loads.

One of the load supply lines L11 through L1n that are branched by the FLs 1021 through 102n in the power supply box 10 for the respective loads and extended to the outside of the power supply box 10 is connected the load connection box 20. The load connection box 20 is arranged at a location separated from the power supply box 10 and electrically fed through the load supply line L11. It also divides the power supplied through the load supply line L11 among a plurality of operating loads 40 so that it may be fed to each of the operating loads 40 by way of a load fuse 201, a load drive relay 202 and a load drive line L4. The load drive relay 202 has a relay contact C operating as an ON/OFF switch and a relay coil L operating as a control input device so that the relay contact C is turned on and off as an ON/OFF control signal is applied to the relay coil L from a load control section 203, although the relay coil may be replaced by some other switching means such as a semiconductor switching device that can operates as a control input device. The power supply control section 103 comprises a microcomputer ($\mu$COM) operated by a given program.

An operation switch 50 that operates for turning on and off the power supply to each of the loads 40 is connected to the load control section 203 of the load connection box 20 and the relay contact C is turned on and off by controlling the power supply to the relay coil L of the load drive relay 202 according to the ON/OFF status of the operation switch 50. More specifically, the power supply control section 103 produces a load data on any of the loads that is turned on or off by the relay contact C and transmits the data to the power supply control section 103 of the power supply box 10 by way of a signal line L5 extending between itself and the power supply control section 103 of the power supply box 10. Thus, upon receiving the data on the ON/OFF status of each of the loads 40, the power supply control section 103 of the power supply box 10 can determine the sum of the load currents to be fed to the loads by referring to the data on the current to be fed to each of the loads stored in its memory. Note that, if the motorcar is provided with multiplex communication lines for multiplex communication among the load connection boxes arranged at various respective locations in the motorcar, any of them may be used for the signal line L5.

It should be also noted that FIG. 2 does not reflect the actual distances separating the power supply box 10, the load connection box 20 and each of the loads 40. They are in fact arranged at various respective locations in the motorcar and the supply lines and the load drive lines connecting them can be rather long.

Figure 3:
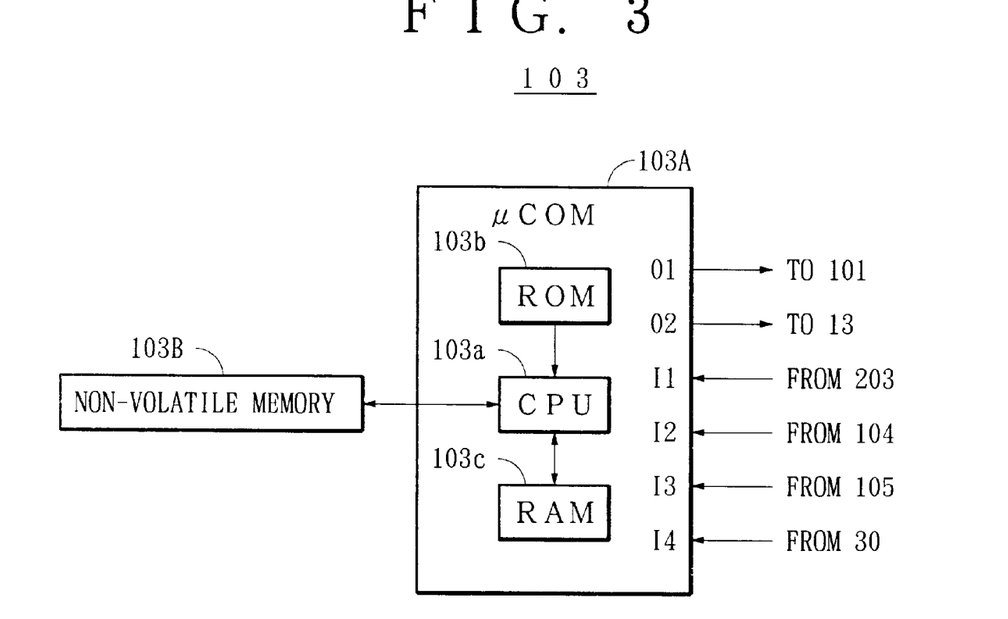
FIG. 3 is a block diagram of a part of the embodiment of FIG. 2, illustrating it in greater detail.

Now, referring to FIG. 3, the power supply control section 103 comprises a microcomputer ($\mu$COM) 103A having a central processing unit (CPU) 103$a$ operated by a given program, a read-only memory (ROM) 103$b$ for storing programs, a random access memory (RAM) 103$c$ having an area for storing various data and an area to be used for processing operations and a non-volatile memory 103B such as an EEPROM for storing the intensities of the electric currents to be fed to the respective loads. The $\mu$COM 103A has a first input port I1 for receiving the load data transmitted from the load control section 203, a second input port I2 for receiving the signal representing an intensity of current and transmitted from the load feeding current sensor 104 after A/D conversion, a third input port I3 for receiving the signal representing an intensity of current and transmitted from the generated current sensor 105 after A/D conversion and a fourth input port I4 for receiving the signal representing the temperature detected by the temperature sensor 30 after A/D conversion along with a first output port O1 for transmitting an ON/OFF control signal to the battery cut-off relay 101 and a second output port O2 for transmitting a control signal to the IC regulator 13 after D/A conversion.

Note that an IC regulator same as the one used in the above described known apparatus may be used in the above embodiment if the μCOM 103A produces a D/A converted analog control signal to the output port O2 and applies it to the IC regulator 13, although the D/A conversion becomes unnecessary if an IC regulator that can be regulated by a digital control signal is used.

Figure 4:
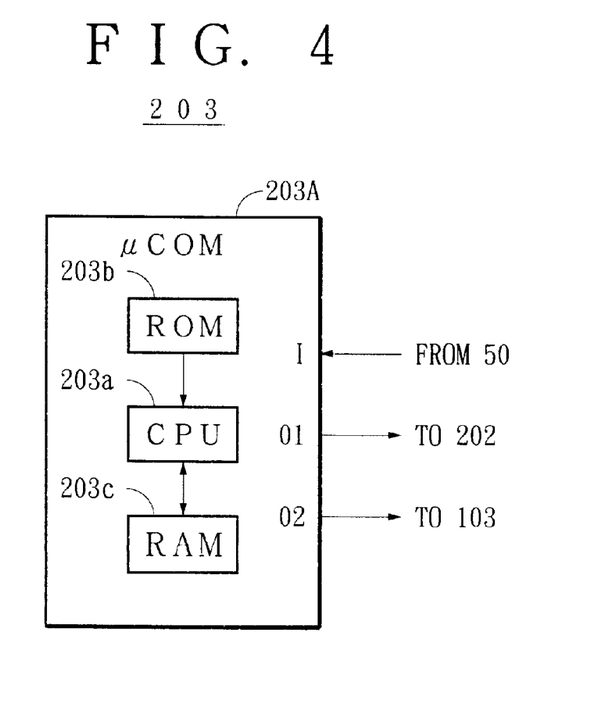
FIG. 4 is a block diagram of another part of the embodiment of FIG. 2, illustrating it in greater detail.

Now, referring to FIG. 4, the load control section 203 also comprises a microcomputer (μCOM) 203A having a central processing unit (CPU) 203*a* operated by a given program, a read-only memory (ROM) 203*b* for storing programs, a random access memory (RAM) 203*c* having an area for storing various data and an area to be used for processing operations. The μCOM 203A has an input port I1 for receiving a control signal representing the ON/OFF operation of the operation switch 50 along with a first output port O1 for transmitting a control signal to the relay coil L operating as a control input device of the load drive relay 202 and a second output port O2 for transmitting a switching data to the power supply control section 103 by way of the signal line L5.

With the above described arrangement, the CPU 203*a* of the μCOM 203A of the load control section 203 monitors the operation switch 50 and shifts the level of the output port O2 to which the relay coil L of the load drive relay 202 is connected from level H to level L when the operation switch 50 is turned on, while it transmits a switching data representing that the operation switch 50 is turned on to the power supply control section 103 by way of the signal line L5. The transmission of the switching data is carried out immediately after the switching operation of the operation switch 50.

On the other hand, the CPU 103*a* of the μCOM 103A of the power supply control section 103 compares the intensity of the load current detected by the load feeding current sensor 104 and sent to the input port I2 after A/D conversion and the intensity of the generated current from the alternator 1 detected by the generated current sensor 105 and sent to the input port I3 after A/D conversion. If, as a result of the comparison, the intensity of the load current is equal to the intensity of the current produced by the alternator 1, it determines that the power distributor is operating under a normal condition and holds to the current operation. If, on the other hand, the intensity of the load current is higher than the intensity of the current generated by the alternator 1, it determines that the generated power is short of the demand for power and transmits a signal representing the shortage to the output port O2 after D/A conversion, which signal is then applied to the IC regulator 13 by way of the signal line L3 to increase the intensity of the excitation current flowing to the IC regulator 13 and hence the rate of power generation of the alternator 1.

If, finally, the intensity of the load current is lower than the intensity of the current produced by the alternator 1, it determines that the battery is being charged with electricity by the alternator 1 and monitors the temperature signal representing the charged condition of the battery and transmitted to the input port I4 after A/D conversion so that, if the temperature keeps on rising, it determines that the battery can become overcharged and lowers the level of the control signal being transmitted to the output port O2 after D/A conversion and applied to the IC regulator 13 by way of the signal line L3 in order to reduce the excitation current flowing to the IC regulator. Thus, the intensity of the electric current produced by the alternator 1 is reduced or the battery 2 is cut off from the circuit by means of the battery cut-off relay 101 to prevent the battery from degradation when the battery shows an abnormal rise in the liquid temperature.

If the intensity of the load current is found to be excessively lower than the intensity of the generated current as a result of the comparison, it so determines that either the battery supply line L1 is short-circuited or the battery is abnormally charged and transmits an ON/OFF control signal to the output port O1 to turn off the battery cut-off relay 101.

If the intensity of the load current is found to be excessively higher than the intensity of the generated current, it is so determined that the alternator is not generating sufficient power or the engine is stopped. Then, the power supply control section 103 monitors the signal representing the intensity of the load current detected by the load feeding current sensor 104 and applied to the input port I2 after A/D conversion and also the change with time of the load current so that it transmits an appropriate ON/OFF control signal to the output port O1 at any appropriate time depending on the detected intensity and the change with time in order to turn off the battery cut-off relay 101 to suspend the operation of any of the loads whenever necessary.

If, for instance, no power is generated by the alternator, the power being fed to the defroster, the blower motor, the mirror heaters and/or the seat heaters that consume power at a relatively large rate may be reduced down to 80 to 50% of the normal level by controlling the duty ratio thereof because the driver and the passenger(s), if any, may be not particularly sensitive to a reduced operation thereof. On the other hand, the supply of power to the head lamps, the tail lamps, the room lamps and the wipers may be maintained to the normal level for a predetermined period of time and reduced only after the elapse of the predetermined time because the driver and the passenger(s), if any, may become uneasy by a reduced operation thereof. The predetermined time may be varied for each of the above listed devices. For example, five minutes may be assigned to the head lamps and 30 minutes to the tail lamps, whereas an hour may be assigned to the room lamps.

The above described control operations can be carried out under the control of the power supply control section 103 when the power supply control section 103 and the load control sections 203 of all the load connection boxes connected to the respective loads are connected by multiplex transmission lines.

Table 1 below summarizes the above described operations.

TABLE 1

| load current vs. generated current | condition | counter measure |
|---|---|---|
| = | normal | maintain the status quo |
| > | insufficient generation | increase the excitation current |
| < | battery charge | increase or reduce excitation current |

TABLE 1-continued

| load current vs. generated current | condition | counter measure |
|---|---|---|
| >> | short circuit or abnormal current | depending on battery liquid temperature cut-off the circuit by battery cut-off relay |
| << | short of generated power stopped engine | stop load operation depending on power consumption of load |

Upon receiving a switching data from the load control section 203, the CPU 103a of the μCOM 103A detects the increase in the number of operating loads and raises, whenever necessary, the level of the control signal being transmitted to the output port O2 after D/A conversion and applied to the IC regulator 13 by way of the signal line L3 according to the result of the detection in order to increase the intensity of the excitation current flowing to the IC regulator 13 so that the loads are fed with a current having a necessary intensity and any undesired voltage drop is avoided.

The CPU 103a reads the intensity of the electric current fed to the loads and accurately grasps the increase in the intensity due to the load turned on for operation by the corresponding switch by referring to the data on the currents for the respective loads stored in the non-volatile memory 103B in order to accurately control the increase in the intensity of the excitation current. It may be needless to say that the number of operating loads may be reduced and, if such is the case, the CPU 103a detects the drop in the intensity of the current fed to the loads due to the load turned off by the corresponding switch. Thus, the CPU 103a can control the voltage being applied to each of the operation loads by suppressing any undesired rise in the voltage that can take place when any of the operating loads is turned off.

Figure 5:
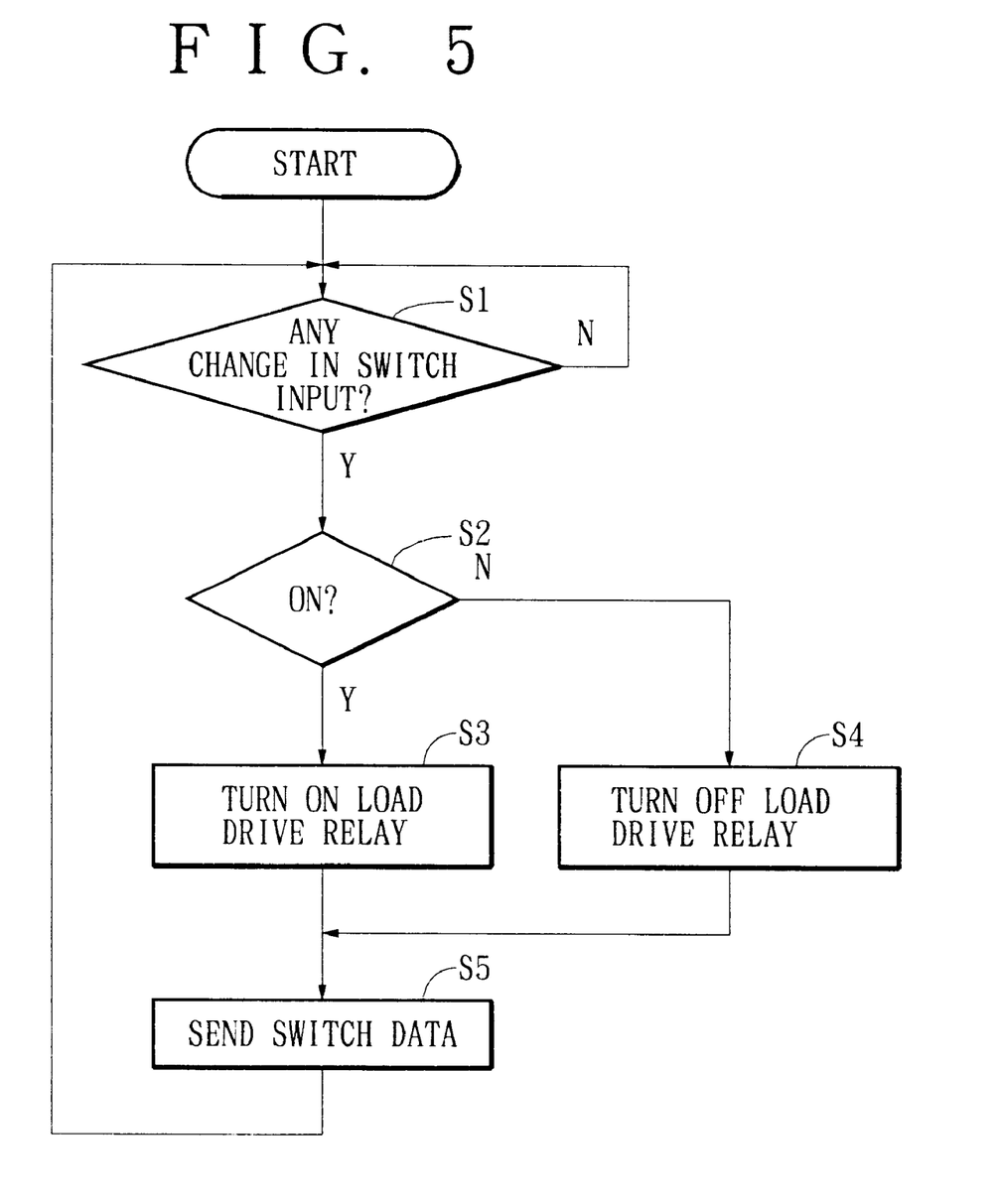
FIG. 5 is a flow chart of the processing operation of the CPU of FIG. 4.
Figure 6:
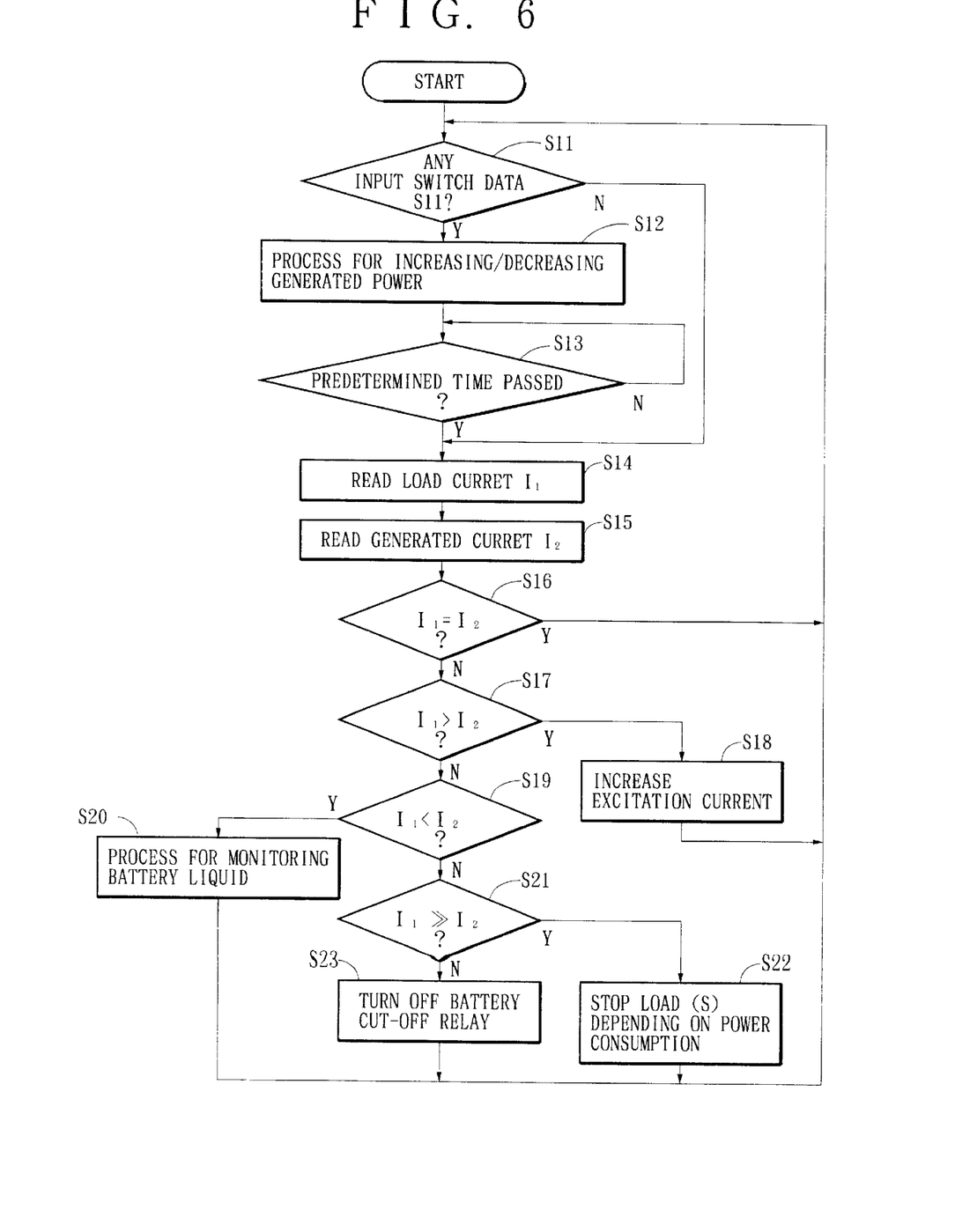
FIG. 6 is a flow chart of the processing operation of the CPU of FIG. 3.

Now, above operations will be described further by referring to FIGS. 5 and 6 showing flow charts of the processing operations of the CPU 203a of the μCOM 203A and the CPU 103a of the μCOM 103A of FIGS. 4 and 3 respectively.

When the power supply is turned on, the CPU 203a starts a series of processing operations illustrated in the flow chart of FIG. 5. Firstly, in step S1, it stands by for detecting the operation of the operation switch 50 connected the load control section 203. If the operation switch 50 is operated to change the switch-related input of the load control section 203, the CPU 203a detects a change in the input in step S1 and proceeds to step S2, where it determines if the switch is turned on or not. If it is determined in step S2 that the switch is turned on, it then goes to step S3, where it lowers the level of the output port O1 to level L in order to turn on the load drive relay, and thereafter further to step S4, where it transmits a switch data identifying the specific switch that is turned on this time to the power supply control section 103 by way of the signal line L5. If, on the other hand, it is determined in step S2 that the switch is turned off, it then proceeds to step S5, where it raises the level of the output port O1 to level H in order to turn off the load drive relay, and thereafter further to step S4, where it transmits a switch data identifying the specific switch that is turned off this time to the power supply control section 103. Then, the CPU 203a goes back to step S1 to repeat the above processing sequence.

While the above embodiment is so designed that a swtich data is transmitted to the signal line L5 for each load connection box 40, it may alternatively be so arranged that a signal is transmitted to signal line L5 when the state of each of the operation switch connected to the load connection box 40 for turning on and off the corresponding load is changed. This arrangement will be described by referring to FIG. 6.

When the power supply is turned on, the CPU 103a starts a series of processing operations illustrated in the flow chart of FIG. 6. Firstly, in step S11, it determines if a switch data transmitted from the load control section 203 is received or not and then proceeds to step S12 if it is determined that the data is received. While FIG. 2 shows only a single load control section 203 contained in a load connection box 20, there are actually provided a plurality of load control sections contained in respective load connection boxes 20 so that the CPU 103a receives a switch data from each of the plurality of load control sections. Then, in step S12, it reads the current capacity of the load corresponding to each specific switch in response to the switch data by referring to the current data stored in the non-volatile memory 103B and raises or lowers the level of the control signal for controlling the IC regulator 13 according to the read out current data, which signal is then subjected to D/A conversion. Thereafter, the CPU 103a proceeds to step S13, where it stands by for a predetermined period of time for stabilization of the intensity of the load current and of that of the generated current.

After the predetermined period of time is over and hence YES is answered in step S13, the CPU 103a proceeds to step S14, where it reads the signal representing the intensity of the current $I_1$ detected by the load feeding current sensor 104 and transmitted to the input port I2 after A/D conversion. Then, it proceeds to step S15, where it reads the signal representing the intensity of the current $I_2$ detected by the generated current sensor 105 and transmitted to the input port I3 after A/D conversion. Thereafter, it proceeds to step S16, where it determines if $I_1$ and $I_2$ it read in steps S 14 and 15 are equal to each other or not. If they are equal to each other and hence YES is answered in step S16, it returns to step S11.

If the two intensities are not equal and hence NO is answered in step S16, the CPU 103a proceeds to step S17, where it determines if the intensity of the load current $I_1$ is higher than the intensity of the generated current $I_2$ or not. If the intensity of the generated current $I_2$ is lower than the intensity of the load current $I_1$, or $I_1 > I_2$, and hence YES is answered in step S17, it determines that the rate of power generation is to be raised and then proceeds to step S18, where it transmits a control signal for raising the intensity of the excitation current flowing to the IC regulator 13 in order to raise the intensity of the generated current. Thereafter, the CPU 103a returns to step S11.

If, on the other hand, NO is answered in step S17, the CPU 103a proceeds to step S19, where it determines if the intensity of the load current $I_1$ is lower than the intensity of the generated current $I_2$. If YES is answered in step S19 and hence the intensity of the generated current $I_2$ is higher than the intensity of the load current $I_1$, or $I_1 < I_2$, then the CPU 103a determines that the battery is being charged with electricity and proceeds to step S20, where it carries out a processing operation for causing the liquid temperature sensor 30 to monitor the liquid temperature before it goes back to step S11.

If, on the other hand, No is answered in step S19, the CPU 103a goes to step S21, where it determines if the intensity of the load current $I_1$ is abnormally higher than the intensity of the generated current $I_2$. If YES is answered in step S21 and hence the intensity of the generated current $I_2$ is abnormally lower than the intensity of the load current $I_1$, or $I_1 \gg I_2$, then the CPU 103a determines that there is either a shortage of generated power or a stopped engine status and goes to step S22, where it carries out a processing routine (which will not be described in detail) for suspending the operation of selected one or more than one loads depending on the power consumption rate of each of the related loads before it goes back to step S11.

If, on the other hand, NO is answered in step S21 and hence the intensity of the generated current $I_2$ is abnormally higher than the intensity of the load current $I_1$, or $I_1 \ll I_2$, then the CPU 103a determines that either there is either a short-circuiting in the supply line L1 or an abnormal charging on the battery 1 and goes to step S23, where it transmits an OFF control signal to the output port O1 to turn off the battery cut-off relay 101 before it goes back to step S11.

Thus, according to the first aspect of the invention, the load feeding current sensor detects the sum of the load currents flowing to the respective loads as it is arranged at a point immediately upstream relative to the branch point for branching the power supply and the generated current sensor detects the current power generating status of the alternator as it detects the intensity of the electric current flowing through the alternator supply line. Then, the power supply control means determines the relationship between the current detected by the load feeding current sensor and the current detected by the generated current sensor by comparing their intensities and controls the power generated by said alternator according to the determined relationship so that the level of the power generated by the alternator can be regulated to match the sum of the load currents and the battery can be controlled appropriately for charging and protected against degradation.

If said power supply control means is so arranged as to increase the rate of power generation of said alternator when the intensity of current detected by said generated current sensor is lower than the intensity of current detected by said load feeding current sensor, the battery is protected against any shortage of electricity for charging it because the level of the power generated by the alternator is made to match the sum of the load currents by increasing the rate of power generation of the alternator whenever the intensity of current detected by the generated current sensor is lower than the intensity of the current detected by the load feeding current sensor.

If a power generation control apparatus according to the invention additionally comprises a liquid temperature sensor 30 for detecting the temperature of the liquid of the battery and transmitting a temperature signal representing the detected temperature and said power supply control means monitors the charged condition of the said battery by way of the temperature signal from said liquid temperature sensor when the intensity of current detected by said generated current sensor is higher than the intensity of current detected by said load feeding current sensor and reduces the rate of power generation of the alternator according to the temperature rise in the liquid of the battery, then the battery is protected against any overcharge because the power supply control means monitors the charged condition of the battery by way of the temperature signal from the liquid temperature sensor when the intensity of current detected by the generated current sensor is higher than the intensity of current detected by the load feeding current sensor and reduces the rate of power generation of the alternator according to the temperature rise in the liquid of the battery.

If the alternator has a switching means arranged on the power supply route at a point closer to the battery than the point of connection of the alternator supply line and said power supply control means cuts said battery off the power supply route by turning off said switching means when the intensity of current detected by said generated current sensor is excessively higher than the intensity of current detected by said load feeding current sensor, then the battery is also protected against any overcharge because the power supply control means cuts the battery off the power supply route by turning off the switching means when the intensity of current detected by the generated current sensor is excessively higher than the intensity of current detected by the load feeding current sensor.

If said power supply control means is so arranged that it receives data on the switching operations conducted for turning on and off said loads and increases the rate of power generation of said alternator when it detects any increase in the number of operating loads, then no voltage drop occurs when one or more than one loads start operating because the power supply control means receives data on the switching operations conducted for turning on and off the loads and increases the rate of power generation of the alternator when it detects any increase in the number of operating loads.

According to the second aspect of the invention, the load feeding current sensor detects the sum of the load currents flowing to the respective loads as it is arranged at a point immediately upstream relative to the branch point for branching the power supply and the generated current sensor detects the current power generating status of the alternator as it detects the intensity of the electric current flowing through the alternator supply line. Then, the power supply control means determines the relationship between the current detected by the load feeding current sensor and the current detected by the generated current sensor by comparing their intensities and controls the intensity of the excitation current flowing to the field coil of the AC generator by controlling the regulator according to the determined relationship so that the level of the power generated by the alternator can be regulated to match the sum of the load currents and the battery can be controlled appropriately for charging.

What is claimed is:

1. A power generation control apparatus to be used for a motorcar power distributor comprising an alternator for generating an alternating current to be subjected to full-wave rectification by means of a rectifier to produce a direct current, said alternator being connected to the power supply route from the battery by way to an alternator supply line at a point immediately upstream relative to the branch point for branching the power supply so that the battery may be charged with power generated by the alternator and the loads may be fed respectively with the branched power supply, comprising:

a load feeding current sensor for detecting the intensity of the electric current flowing through said power supply route at a point immediately upstream relative to the branch point;

a generated current sensor for detecting the intensity of the electric current flowing through said alternator supply line; and a power supply control means for determining the relationship between the current detected by said load feeding current sensor and the current detected by said generated current sensor by comparing their intensities and controlling the rate of power generation of said alternator according to the determined relationship, wherein said power supply control means increases the rate of power generation of said alternator when the intensity of current detected by said generated current sensor is lower than the intensity of current detected by said load feeding current sensor.

2. A power generation control apparatus according to claim 1, further comprising a liquid temperature sensor for detecting the temperature of the liquid of the battery and transmitting a temperature signal representing the detected temperature, wherein said power supply control means monitors the charged condition of the said battery by way of the temperature signal from said liquid temperature sensor when the intensity of current detected by said generated current sensor is higher than the intensity of current detected by said load feeding current sensor and reduces the rate of power generation of the alternator according to the temperature rise in the liquid of the battery.

3. A power generation control apparatus according to claim 1, wherein the alternator has a switching means arranged on the power supply route at a point closer to the battery than the point of connection of the alternator supply line and said power supply control means cuts said battery off the power supply route by turning off said switching means when the intensity of current detected by said generated current sensor is excessively higher than the intensity of current detected by said load feeding current sensor.

4. A power generation control apparatus according to claim 1, wherein said power supply control means receives data on the switching operations conducted for turning on and off loads and increases the rate of power generation of said alternator when it detects any increase in the number of operating loads.

5. A power generation control apparatus to be used for a motorcar power distributor including an alternator having an AC generator including a stator coil for generating an alternating current to be subjected to full-wave rectification by means of a rectifier to produce a direct current, a field coil and a regulator for regulating the excitation current flowing to said field coil in order to electromotive force of said alternator, said alternator being connected to the power supply route from the battery by way of an alternator supply line at a point immediately upstream relative to the branch point for branching the power supply so that the battery may be charged with power generated by the alternator and the loads may be fed respectively with the branched power supply, comprising:

a load feeding current sensor for detecting the intensity of the electric current flowing through said power supply route at a point immediately upstream relative to the branch point;

a generated current sensor for detecting the intensity of the electric current flowing through said alternator supply line; and a power supply control means for determining the relationship between the current detected by said load feeding current sensor and the current detected by said generated current sensor by comparing their intensities and controlling the intensity of the excitation current flowing to said field coil by controlling said regulator according to the determined relationship, wherein said power supply control means increases the rate of power generation of said alternator when the intensity of current detected by said generated current sensor is lower than the intensity of current detected by said load feeding current sensor.

* * * * *